UNITED STATES PATENT OFFICE.

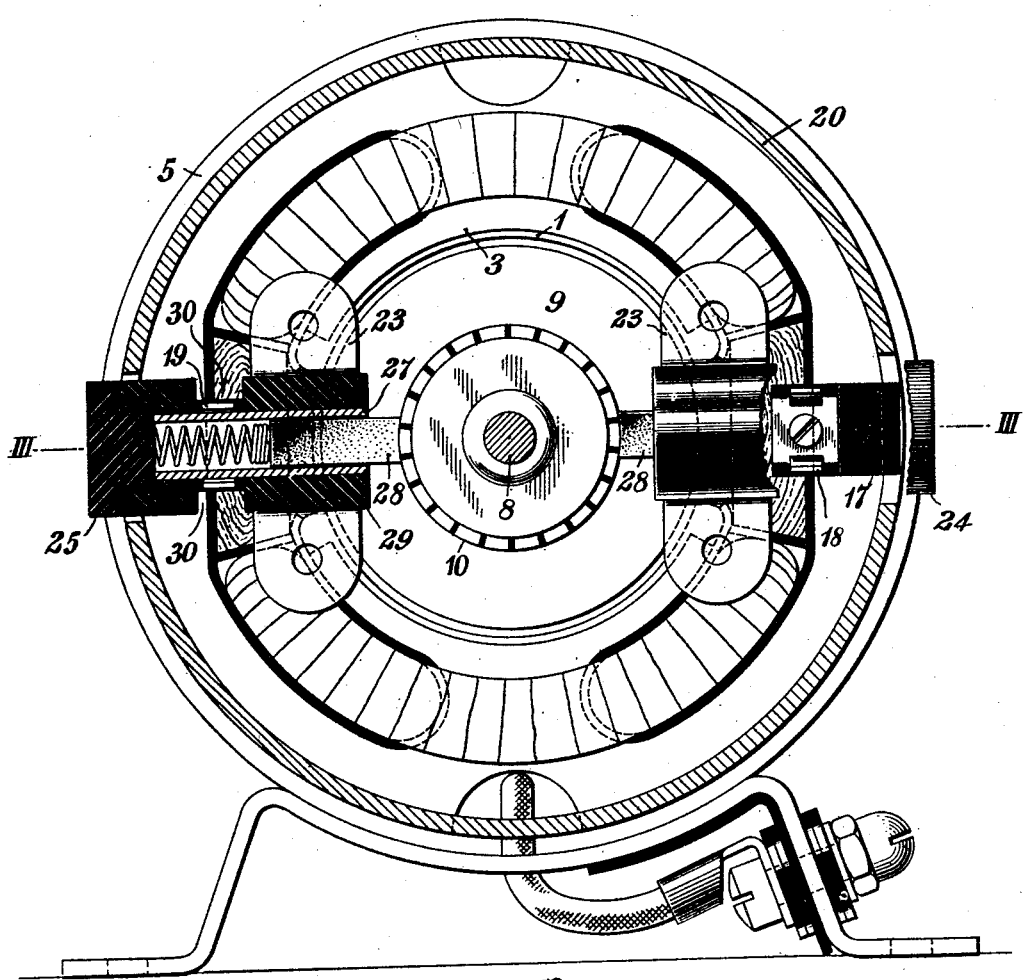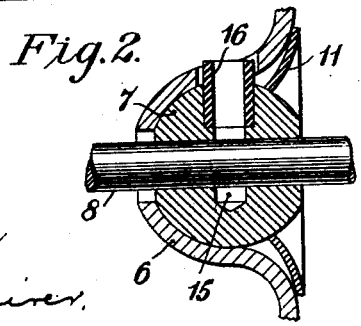

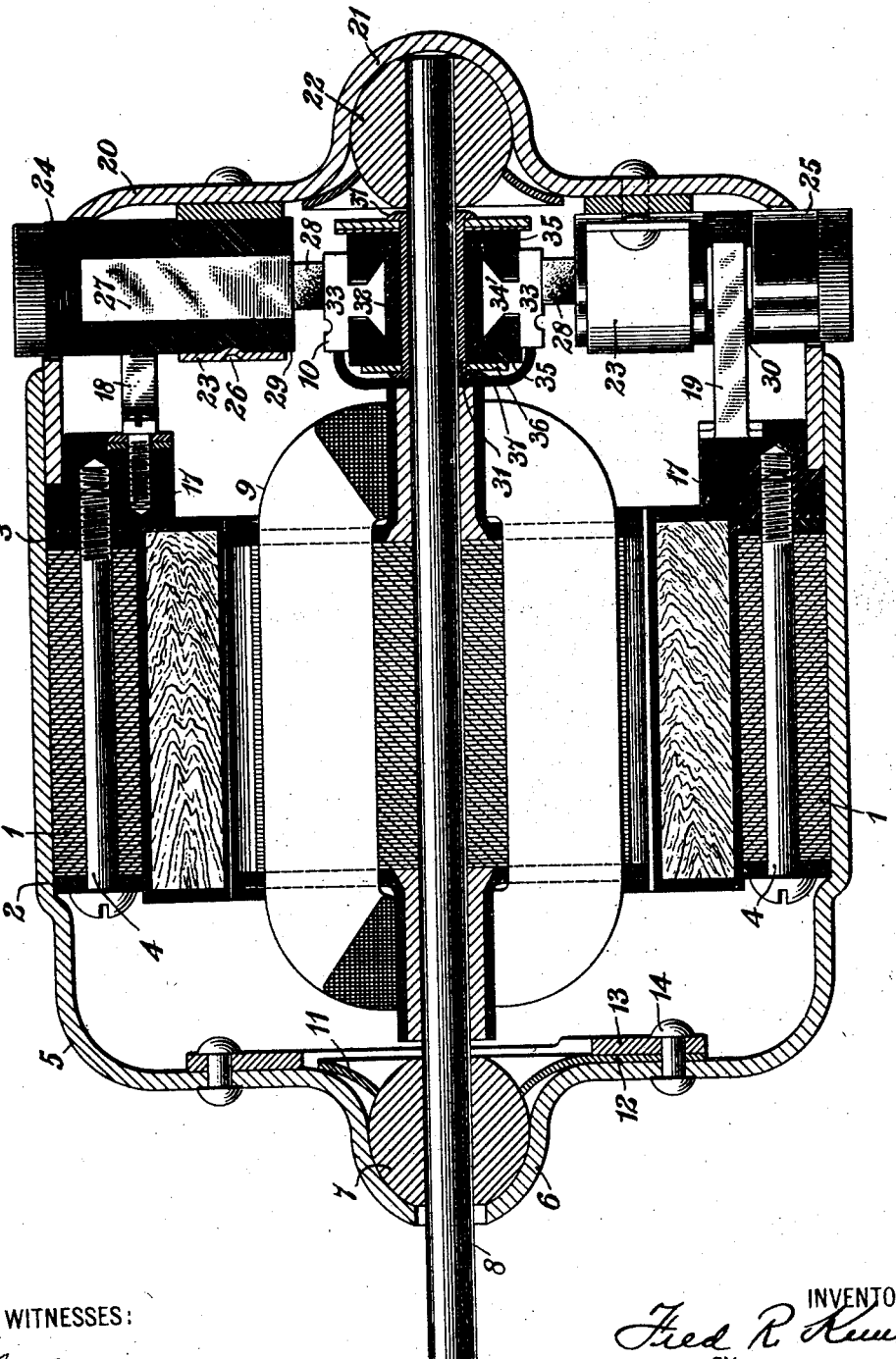

FRED R. KUNKEL, OF EDGEWOOD PARK, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

DYNAMO-ELECTRIC MACHINE.

No. 928,771.      Specification of Letters Patent.      Patented July 20, 1909.

Application filed January 10, 1908. Serial No. 410,221.

*To all whom it may concern:*

Be it known that I, FRED R. KUNKEL, a citizen of the United States, and a resident of Edgewood Park, in the county of Allegheny and State of Pennsylvania, have invented a new and useful Improvement in Dynamo - Electric Machines, of which the following is a specification.

My invention relates to dynamo-electric machines, and it has for its object to provide a machine the parts of which shall be few in number and so constructed and arranged that they may be readily and economically manufactured and assembled into an exceedingly light and compact structure.

Figure 1 of the accompanying drawings is a view, in end elevation and in section, of a machine constructed in accordance with my invention. Fig. 2 is a vertical sectional view through one of the bearings of the machine, and Fig. 3 is a transverse sectional view, on the line III—III of Fig. 1.

A laminated field magnet core 1, that is clamped between end plates 2 and 3, is located within, and is supported by, a closely fitting cup-shaped sheet metal casing 5 in the center of the end wall of which is an external protuberance 6 that provides a substantially hemispherical socket or recess for the reception of a substantially spherical bearing sleeve 7 for a shaft 8, upon which armature 9 and commutator cylinder 10 of the motor are mounted.

The bearing sleeve 7 is secured in the socket, so as to be capable of free adjustment therein, by means of a convex washer 11 having an extension 12 clamped between the end wall of the casing 5 and an annular plate 13 that is secured thereto by means of rivets 14 or other suitable fastening devices, the washer 11 being thus resiliently supported. Extending vertically downward into the bearing sleeve 7 and slightly beyond the opening therein for the reception of the shaft with which it communicates, is an oil recess or passage 15 into the upper end of which is fitted a sleeve 16 that projects through an aperture in the upper side of the protuberance 6 and prevents rotation of the sleeve in the socket.

Extending entirely through the field magnet core are bolts 4 the projecting ends of which are threaded in insulating blocks 17 upon which are mounted resilient U-shaped clips 18 and 19 that constitute the terminals of the motor parts contained within the casing 5.

A cover or end bracket 20 for the casing 5 is also provided, at its center, with an external protuberance 21 that forms a recess or socket for the reception of another substantially spherical bearing sleeve 22 for the shaft 8, the said sleeve being provided with lubricating means and with means for retaining it in the socket which are identical with those employed in connection with the sleeve 7.

Clamped to the end wall of the cover 20, by means of clips 23, are two brush holders 24 and 25 that project through openings in opposite sides of the cover, rotation of the brush holders being prevented by means of protuberances 26 upon the clips that register with corresponding recesses in the brush holders.

Each of the brush holders comprises a metallic sleeve 27 in which operates a brush 28 that bears upon the commutator cylinder 10, and an insulating sleeve 29 that surrounds the said metallic sleeve and is slotted upon opposite sides at 30 to expose the metallic sleeve. When the cover 20 is applied to the casing 5, the U-shaped clips or terminal devices 18 and 19 project into the slots in the insulating sleeves 29 and clamp upon the metallic sleeves 27, the brush holders being, in this manner, connected to the terminals of the motor parts contained within the casing 5.

The commutator cylinder 10 comprises a sleeve 31 that is pressed upon the shaft 8, an insulating sleeve 32 surrounding the sleeve 31, and a plurality of conducting segments 33 arranged to form a cylinder and insulated from the sleeve 31 by the sleeve 32. The segments 33 are provided with dove-tail projections 34 that are embraced and clamped between insulating collars 35 for which reinforcing metallic washers 36 are provided, the said collars and washers being mounted upon the ends of the sleeve 31. The parts of the commutator cylinder are securely clamped together by spinning over or upsetting the ends of the sleeve 31, as indicated at 37.

I make no claim herein to the commutator structure above set forth, but have made the same the subject-matter of a divisional application, Serial No. 456,637, filed October 7, 1908.

I claim as my invention:

1. In a dynamo-electric machine, the combination with stationary and rotatable members, of a sheet metal casing therefor comprising two parts one of which contains and supports the said stationary member and each of which is provided with a substantially hemispherical, outwardly projecting end socket, and substantially spherical bearing sleeves adjustably secured in the said sockets.

2. In a dynamo-electric machine, the combination with stationary and rotatable members, of spherical bearing sleeves for the rotatable member, and a sheet metal casing for the machine comprising two overlapping parts that are provided with substantially hemispherical sockets or seats for the bearing sleeves.

3. In a dynamo-electric machine, the combination with an armature having a shaft and substantially spherical bearing sleeves upon the shaft, of a field magnet, a sheet metal casing comprising two parts one of which contains said field magnet and each of which is provided with a hemispherical socket for one of said sleeves, and means for securing the sleeves in the sockets.

4. The combination with a device having a shaft, and a substantially spherical bearing-sleeve upon the shaft, of a sheet metal bracket provided with a hemispherical socket for the said sleeve, and a resiliently mounted washer securing the sleeve in the socket.

5. A dynamo-electric machine having a sheet metal casing comprising two telescoping parts severally provided with hemispherical sockets, of substantially spherical bearing sleeves secured in the said sockets.

6. In a dynamo-electric machine, the combination with an armature, a shaft, and substantially spherical bearing sleeves upon the shaft having oil passages leading to the shaft, of a sheet metal casing comprising two overlapping parts having substantially hemispherical sockets for the said sleeves, means for securing the sleeves in the sockets, and tubes that project through the socket walls into the oil passages in the bearing sleeves.

In testimony whereof, I have hereunto subscribed my name this 28th day of Dec., 1907.

FRED R. KUNKEL.

Witnesses:
 HAROLD M. SCHEIBE,
 BIRNEY HINES.